US010796012B2

(12) United States Patent
Birkel et al.

(10) Patent No.: US 10,796,012 B2
(45) Date of Patent: Oct. 6, 2020

(54) UNIFYING INTERFACE FOR CLOUD CONTENT SHARING SERVICES (71) Applicant: Intel Corporation, Santa Clara, CA (US)

(72) Inventors: Steven J. Birkel, Portland, OR (US); Rita H. Wouhaybi, Portland, OR (US); Timothy Verrall, Pleasant Hill, CA (US); Mrigank Shekhar, Camas, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/125,504

(22) PCT Filed: Nov. 6, 2013

(86) PCT No.: PCT/US2013/068715
§ 371 (c)(1),
(2) Date: Dec. 11, 2013

(87) PCT Pub. No.: WO2015/069234
PCT Pub. Date: May 14, 2015

(65) Prior Publication Data
US 2015/0213284 A1 Jul. 30, 2015

(51) Int. Cl.
*G06F 7/04* (2006.01)
*G06F 21/62* (2013.01)
(Continued)

(52) U.S. Cl.
CPC .......... *G06F 21/6218* (2013.01); *G06F 21/31* (2013.01); *G06Q 10/10* (2013.01); *G06Q 50/10* (2013.01)

(58) Field of Classification Search
CPC ... H04L 63/10; H04L 67/322; H04L 67/1095; H04L 67/1097; H04L 67/306;
(Continued)

(56) References Cited

U.S. PATENT DOCUMENTS 7,958,453 B1 * 6/2011 Taing ........................ G06F 3/00
715/744
8,924,569 B2 * 12/2014 Li ............................ G06F 21/41
709/227

(Continued)

FOREIGN PATENT DOCUMENTS

KR 10-2013-0120893 A 11/2013
WO WO-2013116362 A1 * 8/2013 ............. H04L 67/00

OTHER PUBLICATIONS

International Search Report and Written Opinion received for PCT Patent Application No. PCT/US2013/068715, dated Aug. 1, 2014, 11 pages.
(Continued)

*Primary Examiner* — Farid Homayounmehr
*Assistant Examiner* — Lizbeth Torres-Diaz
(74) *Attorney, Agent, or Firm* — Schwabe, Williamson & Wyatt, P.C.

(57) ABSTRACT

Methods and systems that allow a user to see the people or groups who have access to files that are maintained by a plurality of cloud content sharing services. In particular, the user may see what specific party has access to each particular file or directory, regardless of multiple cloud content sharing services involved. Moreover, a user interface and exposed application program interface allows the user to manipulate the permissions, e.g., granting access, to another person or group, to a file or directory. The user interface may also allow the user to terminate access to the file or directory for a person or group. The user's action to change a
(Continued)

permission may be effected independently of the particular cloud content sharing service.

25 Claims, 9 Drawing Sheets

(51) Int. Cl.
   *G06Q 50/10* (2012.01)
   *G06Q 10/10* (2012.01)
   *G06F 21/31* (2013.01)

(58) Field of Classification Search
   CPC ......... G06F 2212/152; G06F 17/30091; G06F 17/30165; G06F 17/30067; G06F 21/6218; G06F 21/6236; G06F 21/6272; G06F 2221/2141; G06F 17/30171; G06F 3/048; G06F 21/31
   See application file for complete search history.

(56) References Cited

U.S. PATENT DOCUMENTS

| | | | | |
|---|---|---|---|---|
| 9,633,125 | B1* | 4/2017 | Garcia | G06F 16/9562 |
| 2004/0221049 | A1* | 11/2004 | Blumenau | H04L 63/0442 |
| | | | | 709/229 |
| 2007/0255715 | A1* | 11/2007 | Li | G06Q 10/00 |
| 2008/0015823 | A1* | 1/2008 | Arnold | G06F 8/20 |
| | | | | 703/1 |
| 2008/0059495 | A1* | 3/2008 | Kiessig | G06F 16/10 |
| 2008/0082538 | A1* | 4/2008 | Meijer | G06F 21/6218 |
| 2009/0307604 | A1* | 12/2009 | Giles | G06F 21/604 |
| | | | | 715/751 |
| 2009/0327447 | A1* | 12/2009 | Noll | H04L 67/10 |
| | | | | 709/216 |
| 2010/0332456 | A1* | 12/2010 | Prahlad | H04L 67/1095 |
| | | | | 707/664 |
| 2011/0167435 | A1* | 7/2011 | Fang | G06F 3/0605 |
| | | | | 719/329 |
| 2011/0252071 | A1* | 10/2011 | Cidon | G06F 16/178 |
| | | | | 707/802 |
| 2011/0265030 | A1* | 10/2011 | Lin | G06F 3/04845 |
| | | | | 715/790 |
| 2012/0110055 | A1* | 5/2012 | Van Biljon | G06Q 30/04 |
| | | | | 709/201 |
| 2012/0167197 | A1* | 6/2012 | Kruger | G06F 21/62 |
| | | | | 726/16 |
| 2013/0066975 | A1* | 3/2013 | Kantor | H04L 63/101 |
| | | | | 709/205 |
| 2013/0179898 | A1* | 7/2013 | Fang | H04L 67/1097 |
| | | | | 719/312 |
| 2013/0185457 | A1* | 7/2013 | Campbell | G06F 3/0661 |
| | | | | 710/5 |
| 2013/0191339 | A1* | 7/2013 | Haden | H04L 67/10 |
| | | | | 707/638 |
| 2013/0219176 | A1* | 8/2013 | Akella | G06F 16/185 |
| | | | | 713/165 |
| 2013/0219456 | A1* | 8/2013 | Sharma | G06F 16/188 |
| | | | | 726/1 |
| 2013/0263289 | A1* | 10/2013 | Vijayan | H04L 67/1097 |
| | | | | 726/31 |
| 2014/0279893 | A1* | 9/2014 | Branton | G06F 16/904 |
| | | | | 707/634 |
| 2014/0280932 | A1* | 9/2014 | Braun | H04L 63/10 |
| | | | | 709/225 |
| 2014/0282851 | A1* | 9/2014 | Miller | H04L 63/102 |
| | | | | 726/1 |
| 2016/0036822 | A1* | 2/2016 | Kim | H04L 67/1097 |
| | | | | 726/4 |

OTHER PUBLICATIONS

Extended European Search Report dated Mar. 28, 2017 for European Patent Application No. 13897081.9, 7 pages.
Office Action dated Jan. 12, 2017 for Canadian Patent Application No. 2,926,605, 4 pages.
Office Action dated Jan. 24, 21018 for Canadian Patent Application No. 2,926,605, 4 pages.

* cited by examiner

UNIFYING INTERFACE FOR CLOUD CONTENT SHARING SERVICES

TECHNICAL FIELD

Embodiments described herein relate to networked content sharing.

BACKGROUND

A number of cloud-based content-sharing services have appeared in recent years. These include cloud content sharing services such as Dropbox, Google Drive, and Box.net. Each of these services allows a user to store files in a cloud-based filespace that is controlled by the user or his/her group. These files may represent text, images, audio, or video content. The files may be mirrored and synchronized with a locally stored directory at any or all of the user's computing devices. Moreover, the files may be shared with other users via the cloud content sharing service. In the user's filespace, certain files or directories may be made accessible to certain other users who may also subscribe to the same service.

Access to the various files and directories may become difficult to manage, however. There may be a large number of files in the user's filespace and a large set of other users who have some degree of access. Different people or groups may be given access to different files or directories, and the user may have difficulty keeping track of who has access to which files, contending with multiple content management user interfaces. This can lead to inadvertently exposing a file to a party that should not be authorized to have access.

The problem is compounded if the user subscribes to two or more cloud content sharing services. The user may maintain some files or directories on Dropbox, others on Google Drive, and still others on Box.net, for example. Access to some files or directories may be maintained on two or more of these services. For each service, different persons or groups may have access to a given file. In such a situation, the user may have difficulty knowing who has access to what content, and whether such access is permissible or represents a security risk.

For example, a contractor may share certain files or directories with its client via Dropbox, and may share files or directories with a subcontractor via Google Drive. Some of the files may be the same for each service, while others are not. The contractor may wish to allow the client to access certain files, but not want the subcontractor to have access to these same files; conversely, it may be desirable for the subcontractor to have access to a file, but not permit the client to have access to this file. Over time, the permissions may shift, so that a person should be granted access to a file only after some milestone in the contract has passed, or denied access after he has been taken off the project, for example. At any given moment, the user may not have a clear picture of what parties have access to a given file, and therefore may risk exposing a file to an unauthorized person.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems that offer an advantage of allowing a user to see the people or groups who have access to files that are maintained in a plurality of cloud content sharing services. Embodiments may allow the user to see, at a glance, whether the appropriate parties or groups have access to particular files or directories, and whether any files or directories are being improperly exposed to parties or groups who should not have access. In particular, the user may see what specific parties or groups have access to a particular file or directory, regardless of the cloud content sharing service involved. Moreover, a user interface may allow the user to manipulate the permissions, e.g., grant access, for another person or group, to a file or directory. The user interface may also allow the user to revoke access to the file or directory for a person or group for confidentiality purposes, for example. The user's action to change access permission may be effected independently of the particular cloud content sharing service.

Figure 1:
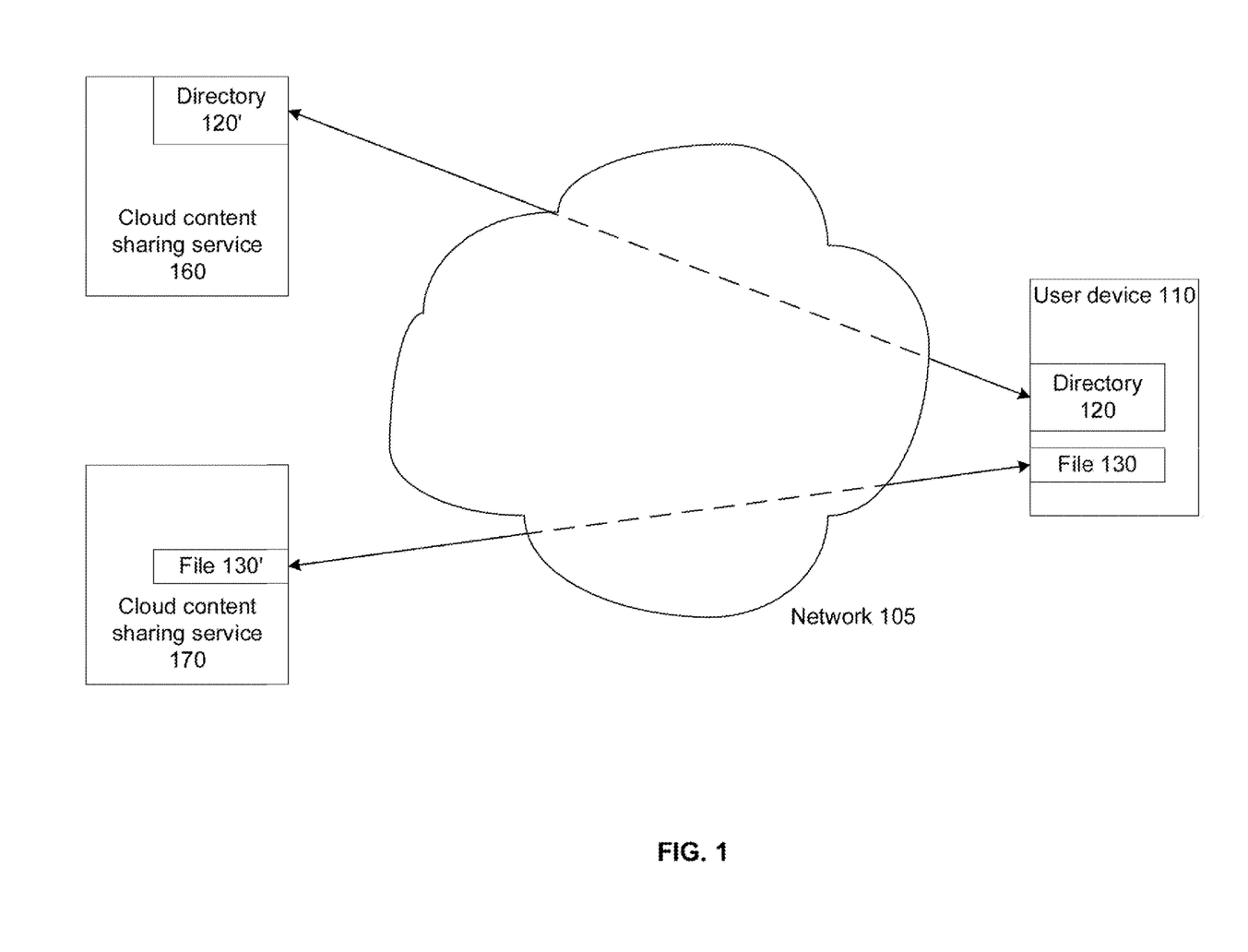
FIG. 1 is a block diagram illustrating multiple cloud content sharing services.

Context for the systems and methods described herein is illustrated in the example scenario of FIG. 1. Here, a user device 110 stores a directory 120 and a file 130. Note that the term "directory," as used herein, refers to a collection of any number of files. A directory may contain multiple files, or may contain zero files moreover, a directory may include one or more other directories. The device 110 may be any computing device without limitation, such as a desktop personal computer, a laptop, a tablet computer, a smartphone, or a wearable computer. The directory 120 is also maintained by a cloud content sharing service 160. The directory 120, as maintained by this service, is shown as directory 120'. Changes made to the directory 120 by the user may be reflected as corresponding changes to directory 120'. The user's file 130 may be maintained by a different cloud content sharing service, shown as service 170. Changes made to the file 130 by the user may be reflected as corresponding changes to file 130'. The user may also be able to access directory 120' and file 130' through any of his computing devices. Any changes made to these files or directories may be made locally at whatever device is used by the user, and reflected in their copies stored at the cloud content sharing services. Moreover, changes to file 130' and directory 120' by other users may be mirrored at their respective copies at the user's assorted local computing devices. While a file is shown stored at service 170 and a directory is shown stored at service 160, note that in general any number of files and/or directories may be stored at either service.

In addition, a cloud content sharing service will typically store metadata related to the files and/or directories stored by the service. This metadata may include, for example, access control data that describes the parties or groups that have permission to access the files and/or directories stored by the service. The interaction between the user's devices, such as user device 110, and the cloud content sharing services, may take place via a network 105, such as the Internet, an intranet, a wide area network, a local area network, a personal area network, or some combination thereof.

Figure 2:
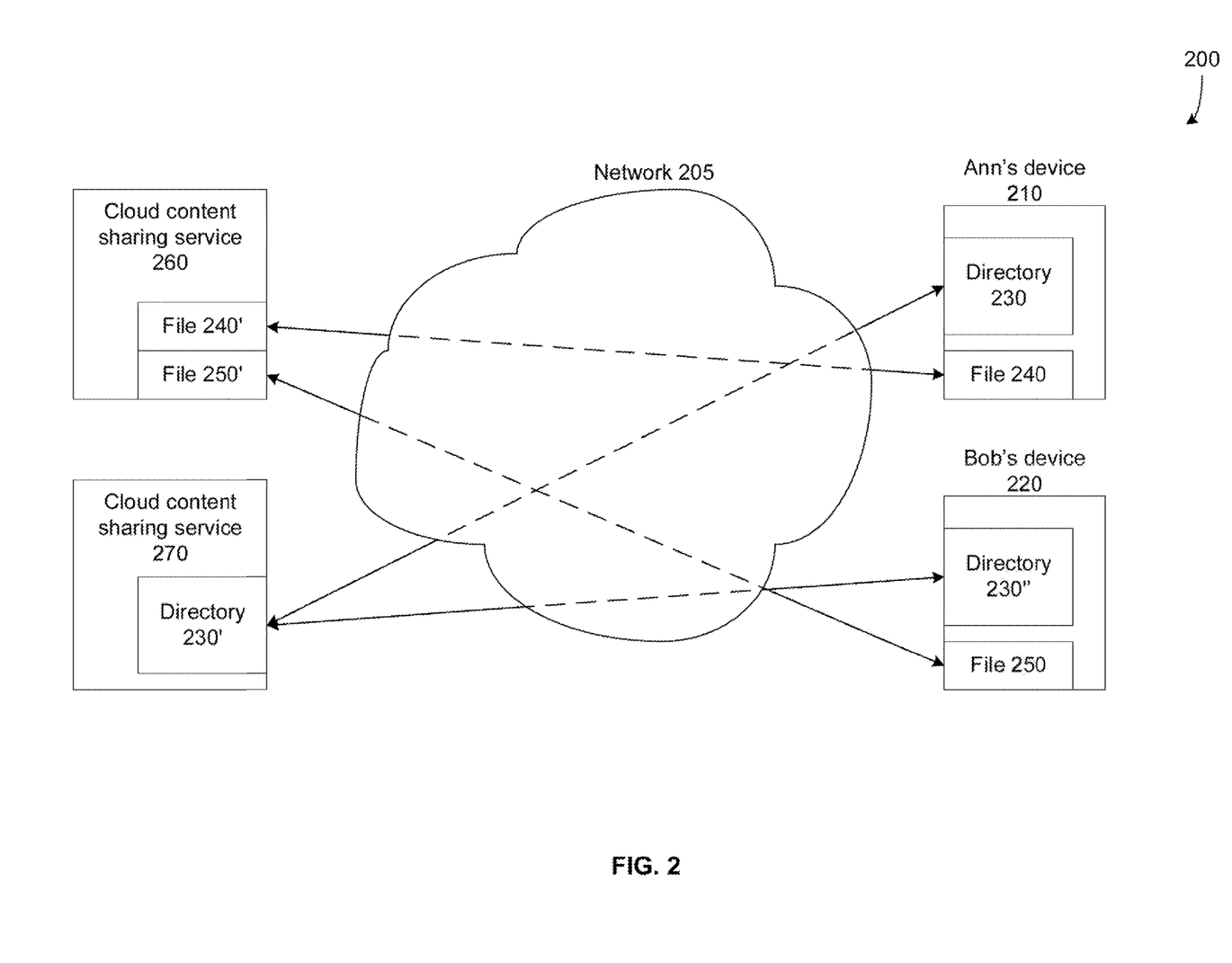
FIG. 2 is a block diagram illustrating multiple cloud content sharing services and file access by multiple parties.

By storing files or directories at a cloud content sharing service, a file or directory may be made available to other parties who also subscribe to the service. This is illustrated in FIG. 2. Here, user Ann may have a computing device 210 that stores a directory 230 and a file 240. Ann may use a cloud content sharing service 270 to maintain directory 230, shown at this service as directory 230'. She may use another such service 260 to maintain file 240, which is stored at this service as file 240'.

Ann's directory 230' may also be accessible by user Bob, via Bob's computing device 220. Bob's device 220 may therefore also maintain a copy of this directory, shown as directory 230". Any changes to this directory, by either user, may be synchronized with the copy 230' of this directory, and with the copy stored at the other user.

Figure 3:
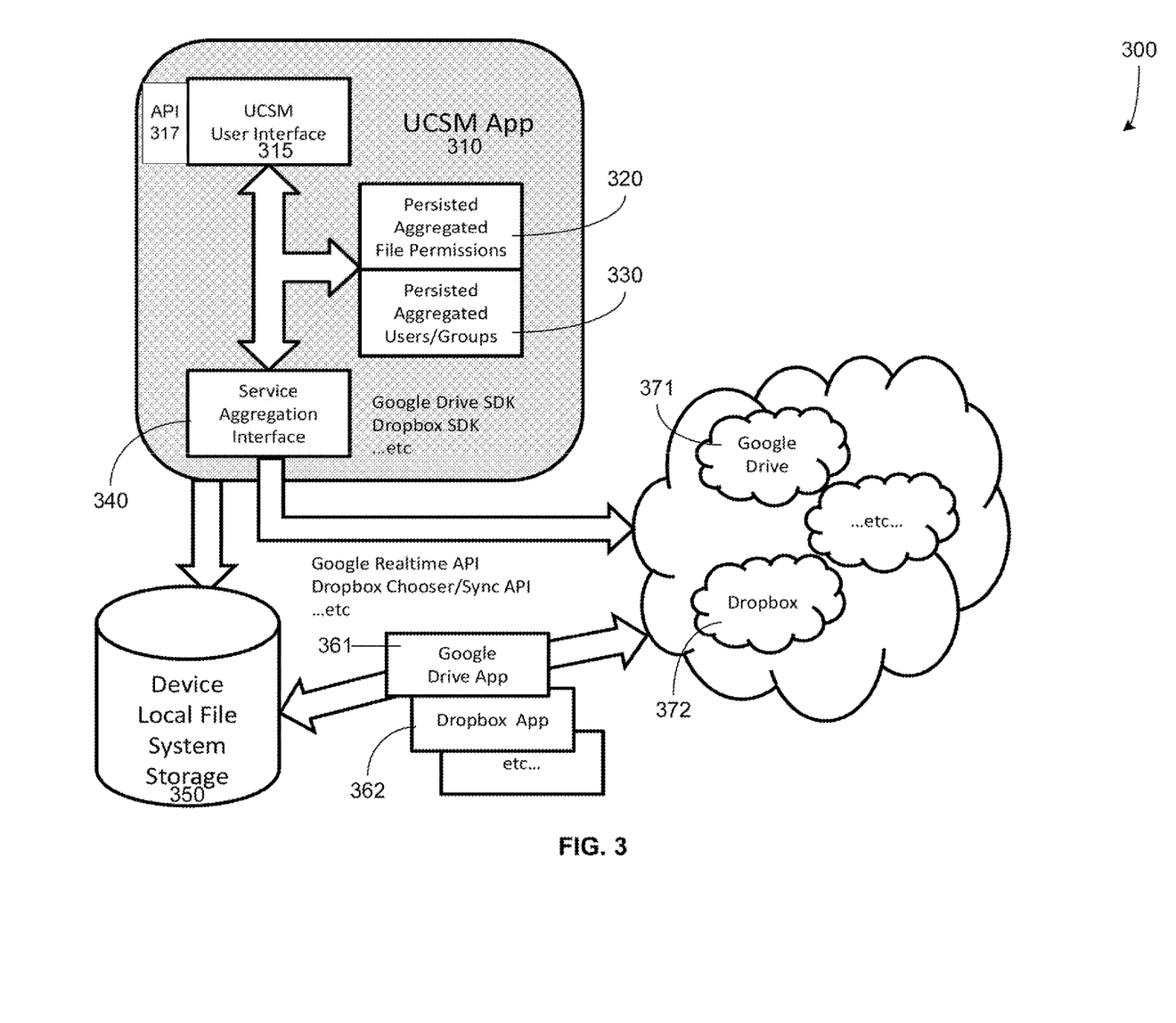
FIG. 3 is a block diagram illustrating the system described herein, according to an embodiment.

FIG. 3 illustrates an embodiment of the system described herein. The system may include a unified cloud service management (UCSM) application 310. This application may include a user interface module 315 in communication with two stores, a persisted aggregated file permissions (PAFP) store 320 and a persisted aggregated users/groups (PAUG) store 330. The PAFP store 320 may reflect some or all of the local file system in storage 350 and some or all of the files and directories (i.e., objects) shared in the various cloud content sharing services. The PAUG store 330 may identify a service-agnostic view of persons and groups (i.e., subjects) with which the user shares files and directories via the cloud content sharing services. Collectively, the PAFP store 320 and the PAUG store 330 may provide enough information to describe the shared files and directories controlled by the local user, and the users and groups that may access them. Further, the UCSM application may expose application program interface (API) functions that extend the functions of the User Interface to other programs on the platform on which the UCSM executes.

This collective information identifying files and directories, plus the parties having access to the files/directories may be presented to the local user through the user interface module 315. The user interface module 315 may present this information in a tabular form, in a graphical form, or in any other manner known to persons of ordinary skill in the art. Examples of these forms of presentation will be discussed in greater detail below.

The user may use user interface module 315 to manipulate the access permissions, i.e., may grant, to a particular person or group, access to a file or directory, or may revoke such access. Such an action may be effected at the appropriate cloud content sharing service using an application program interface provided by that service. For example, if a person currently has access to a file via Dropbox, an instruction may be sent to Dropbox (372) through the local API for Dropbox. The various software development kits (SDKs) for the respective cloud content sharing services may be used to create a service aggregation interface module 340 to allow interfacing with these services. As before, local user files in storage 350 may be synchronized with the various cloud content sharing services 371, 372, etc., using the respective applications (361, 362, . . . ) for these services.

Figure 4:
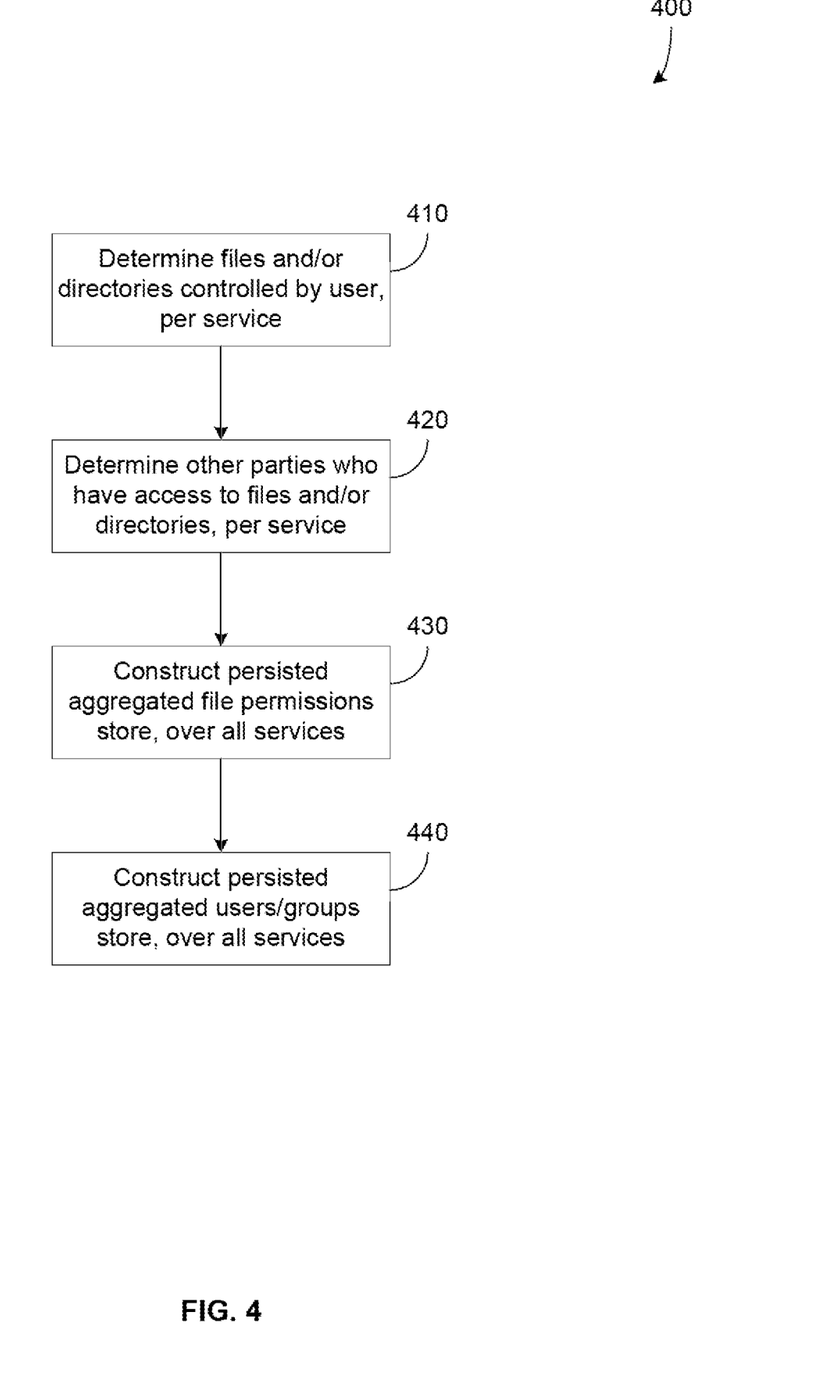
FIG. 4 is a flow chart illustrating the construction of information stores, according to an embodiment.

The creation of the PAFP store 320 and the PAUG store 330 is illustrated in FIG. 4, according to an embodiment. At 410, the files and directories that are controlled by the user are identified. These files and directories may represent the entities for which the user may control access. As noted at 410, the cloud content sharing service that is used for each file/directory is also determined. It should be noted that a given file or directory may be shared through more than one such service, and the PAFP and PAUG may be maintained is such a way as to reflect summary fileto-directory mappings across multiple cloud content sharing services.

At 420, the other parties (e.g., other persons or groups) having access to each such file or directory may be determined. Again, this determination is made per cloud content sharing service, so that each party's access to a particular file or directory is determined for each service through which the file/directory is shared.

At 430, the PAFP store may be constructed, drawing on data gathered at 410 and 420. As discussed above, the PAFP store identifies the objects shared in the various cloud content sharing services. At 440, the PAUG store may be constructed. This store provides a service-agnostic view of all users and groups with which the user shares files or directories, as noted above.

Figure 5:
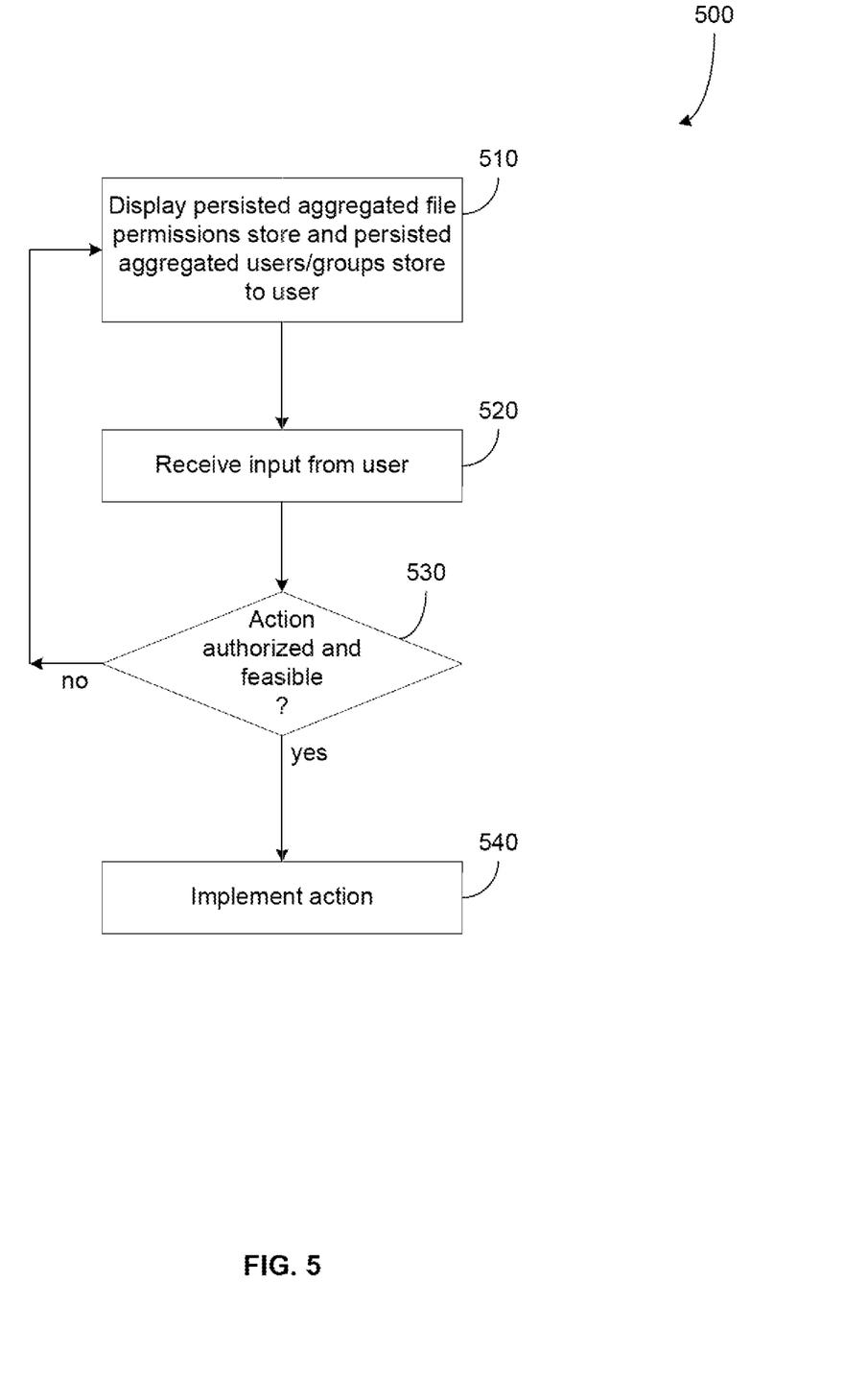
FIG. 5 is a flow chart illustrating operation of a user interface module, according to an embodiment.

Operation of the user interface is illustrated in FIG. 5, according to an embodiment. At 510, the persisted aggregated file permissions store and the persisted aggregated users/groups store may be displayed to the user. These stores may be presented to the user in any of several ways, as would be understood by a person of ordinary skill in the art. Examples will be described in greater detail below. At 520, input may be received from the user. Such input may take the form of choosing some action, such as granting, to a user or group, access to a particular file or directory, for example, or revoking such access.

At 530, a determination may be made as to whether such an action is authorized and feasible. In an embodiment, the authority of the user to take such an action may be verified. It may be prudent, for example, to verify that the user is in fact authorized to grant access to a file or directory to a particular person, and that this person is authorized to receive access to this file or directory. In addition, it may be useful to verify that the intended action is feasible. Granting or denying access to a file to a particular person may not be feasible if that person does not subscribe to the cloud content sharing service that maintains this file, for example. If the desired action is both authorized and feasible, then the action may be implemented at 540. Otherwise, the processing may return to 510.

Figure 6:
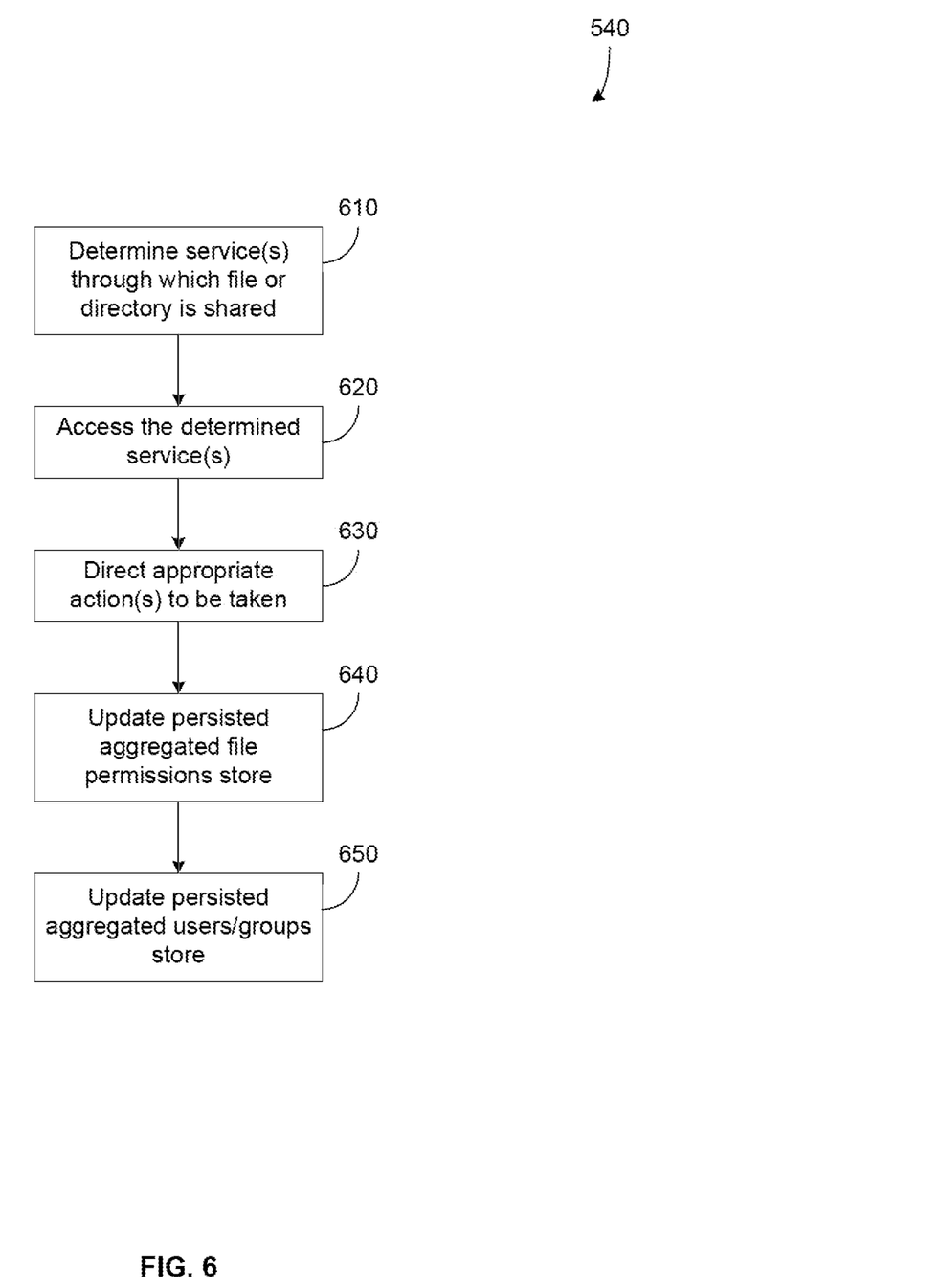
FIG. 6 is a flow chart illustrating implementation of a change to an access permission, according to an embodiment.

Implementation of the action corresponding to the user's input (540 of FIG. 5) is illustrated in greater detail in FIG. 6, according to an embodiment. At 610, the user's input at the user interface may be interpreted to determine the cloud content sharing service(s) through which the designated file or directory is shared. At 620, and the service(s) may be accessed. At 630, the action identified by the user's input may be converted into an instruction directed towards the service(s) determined at 610. In an embodiment, 610-630 may be implemented in service aggregation interface 340, shown in FIG. 3. Once the action is completed, at 640 the persisted aggregated file permissions store may be updated or reconstructed in the manner shown in FIG. 4. At 650, the persisted aggregated users/groups store may also be updated or reconstructed in this manner.

Figure 7:
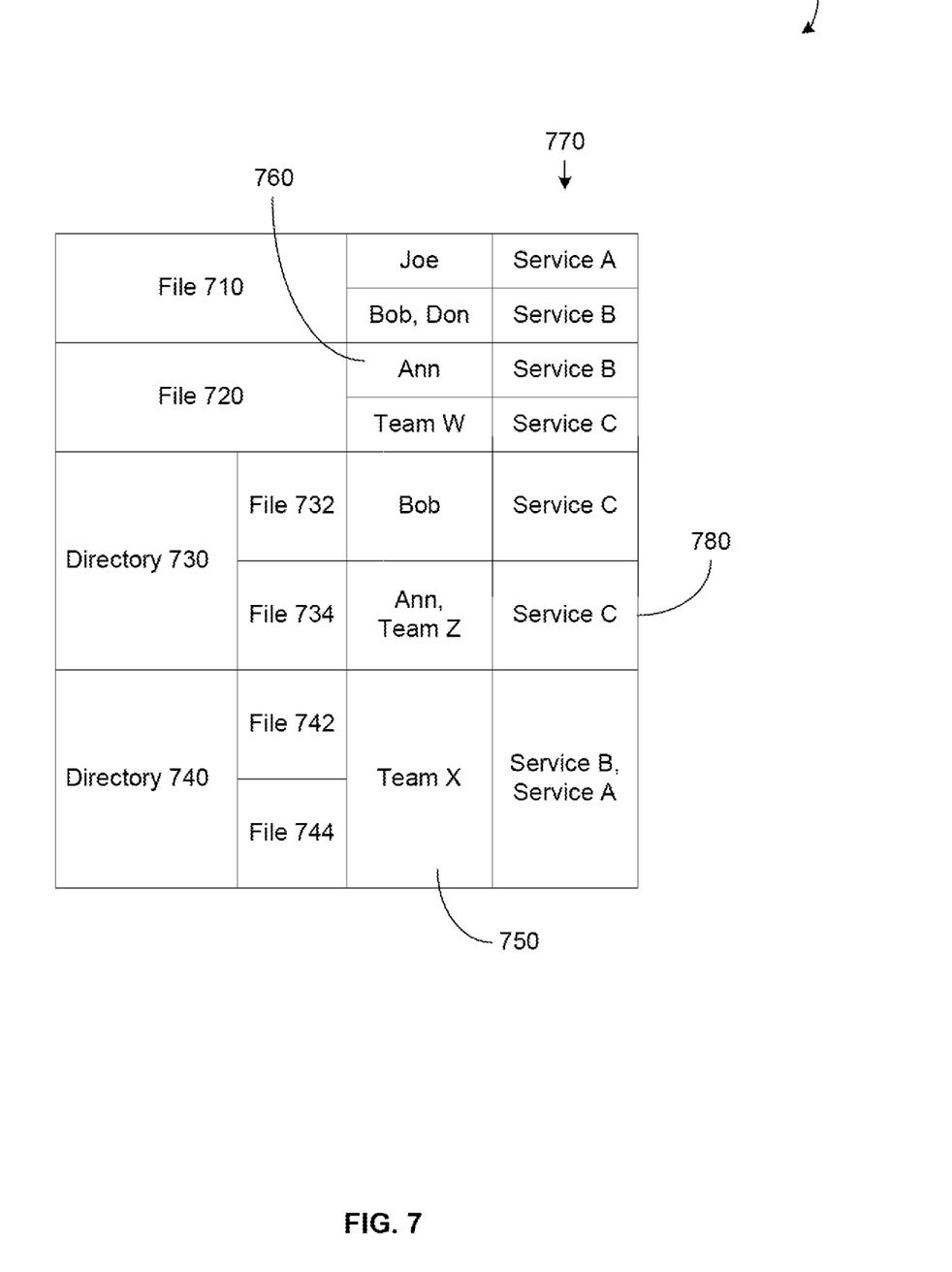
FIG. 7 is an example of a user interface, according to an embodiment.

One example of a possible user interface design abstraction is illustrated in FIG. 7, according to an embodiment. As discussed above, such an interface may present the information maintained in the persisted aggregated file permissions store and the persisted aggregated users/groups store. FIG. 7 shows a user interface in a tabular form. Here, file 710 is shown as being accessible by Joe through cloud content sharing service A. This same file is also shared through a second service, service B, with Bob and Don. Another file, shown as file 720, is also shared through service B, this time with Ann. File 720 is also shared through service C, and may be accessed by the members of a group shown as Team W. Note that the user interface design abstraction of FIG. 7 is organized by file or directory, in that a file or directory may be looked up in the first column and information related to that file or directory (e.g., parties and groups that have access, and the particular service(s) involved) appears in the same row. In an alternative embodiment, a user interface may be organized by person or group in the first column, for example, such that information related to a person or group (e.g., files or directories that this person or group may access, and the service(s) involved) may be found in the same row. Other variations of such an interface may also be used, as would be understood by a person of ordinary skill in the art.

As discussed above, directories containing some number of files may also be shared through cloud content sharing services. A directory 730 is shown containing two files, 732 and 734. File 732 is accessible by Bob through service C. File 734 is also accessible through service C to Ann and to members of Team Z. A second directory, shown as directory 740, contains two files, 742 and 744. This directory and both of its files are shared through services A and B with members of Team X.

To make changes in the accessibility of various files and directories, the user may manipulate the associations depicted in the interface abstraction. For example, in one embodiment, the user may drag and drop the names of users into new locations; the user may also delete or add names. If the user wishes to give Joe access to directory 740, the user may add Joe's name the field 750. After implementation of such an input, both Team X and Joe would have access to the files in directory 740, through services A and B (assuming that Joe is a subscriber to both of these services). If the user wishes to revoke Ann's access to file 720, her name may be deleted from the appropriate field (760). Similarly, entries in the column 770 that identify the various services may also be manipulated. This would serve to make files available to designated parties via a specified service. If for example, the user wished to allow Bob to access file 732 through the service B, a reference to this service would be added to the appropriate field (780). In other embodiments, other graphical or textual manipulations of the interface (other than dragging and dropping) may be employed instead, as would be understood to persons of ordinary skill in the art.

In an alternative embodiment, various forms of access may also be tracked and presented to the user. Some persons may only have read access to certain files, for example, while other persons may have both read and write access. In such an embodiment, an additional column may be used to specify the type of access given to a particular person or group with respect to a particular file or directory.

Figure 8:
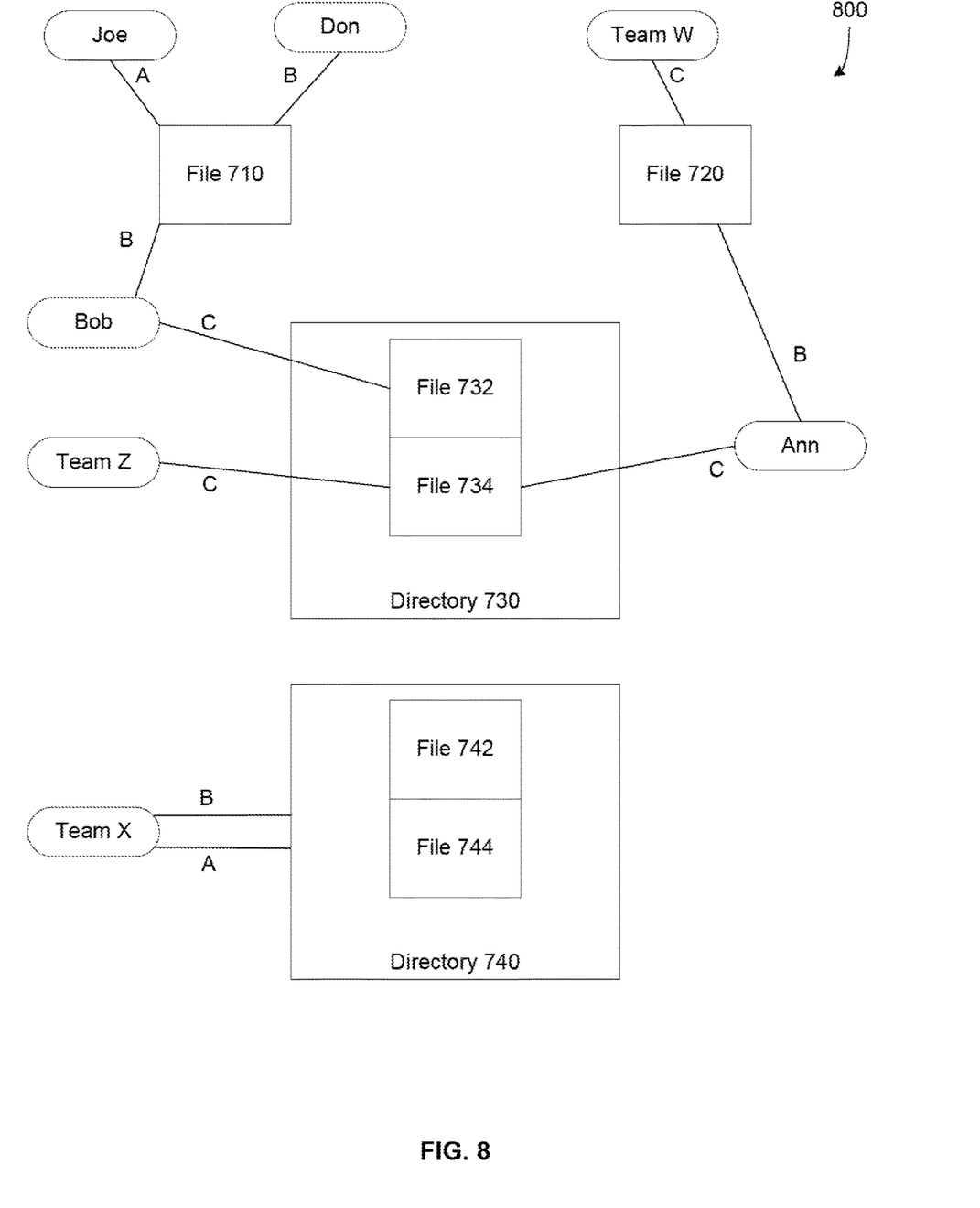
FIG. 8 is an example of another user interface, according to an alternative embodiment.

The persisted aggregated users/groups store and the persisted aggregated file permissions store that are presented to the user in FIG. 7 may also be presented in a more graphical form as shown in FIG. 8, according to an alternative embodiment. Here, files and directories are shown as rectangular icons, while persons and groups are shown as oval icons. Access is indicated by lines that connect persons or groups to files and directories. These lines are labeled to indicate the cloud content sharing service through which the file or directory is shared. As before, Joe has access to file 710 through cloud content sharing service A. Both Don and Bob have access to this file through service B. Bob can also access file 732 of directory 730 using service C. File 734 in this directory is available to Team Z and to Ann through this same service. Team W has access to file 720 through service C. Ann may access this file through service B. Team X may have access to the files of directory 740 through both services A and B. In some circumstances, directories may contain other directories (sometimes called subdirectories), and these latter subdirectories may contain still more subdirectories, etc. In such a situation, the interface abstraction of FIG. 8 may grow graphically complex. In an embodiment, a high level topology may be shown, indicating the access permitted to higher level directories and files. A zoom feature may be used to allow a more detailed view of lower level subdirectories.

Using an interface such as the one shown in FIG. 8, the user may manipulate access by manipulating the graphics in one embodiment. If the user wishes to grant Joe access to directory 740, for example, the user may draw a line from Joe's icon to the rectangle representing this directory. The user may then label that line according to the cloud content sharing service to be used for Joe's access. If the user wishes to revoke Ann's access to file 720, the user may delete the line segment connecting Ann's icon to that of file 720.

In an alternative embodiment, different forms of access (e.g., read and write) may also be shown in interface 800. This may be accomplished, for example, by indicating the form of access on the various line segments (e.g., R or W, or both), and could be conveyed either by modification of the shape, color, or other object attributes.

In addition, in some circumstances, the user may have a choice as to which cloud content sharing service to use in sharing a file or directory. In this case, the user may elect a particular service on the basis of which service has the superior quality of service or cost, for the particular person involved. Factors such as bandwidth and storage capacity may be used in this decision. A particular service may also be chosen because this service is available to the person needing access, where other services are not available to this person. In an embodiment, these considerations may be evaluated by the unified cloud service management application 310 (shown in FIG. 3) so that a recommended service is presented to the user in such a case. Alternatively, the user may make this decision on his own.

In another embodiment, the GUIs of FIGS. 7 and 8 may also name other parties who may be interested in accessing one or more of the user's files or directories. The unified cloud service management application 310 may perform a search of the user's contact lists and social media contacts, for example, to identify such parties. Such parties may then be recommended to the user via the GUI.

Various embodiments may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, modules composed of such elements, and so forth.

Examples of software may include software components, computer programs, application programs, system programs, machine programs, operating system software, middleware, firmware, software modules, routines, subroutines, functions, methods, procedures, software interfaces, application program interfaces (API), instruction sets, computing code, code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The terms software and firmware, as used herein, may refer to a computer program product including a computer readable medium having computer control logic stored therein to cause a computer system to perform one or more features and/or combinations of features disclosed herein. This computer program logic may represent control logic to direct the processing of the computer. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device or tangible medium.

Figure 9:
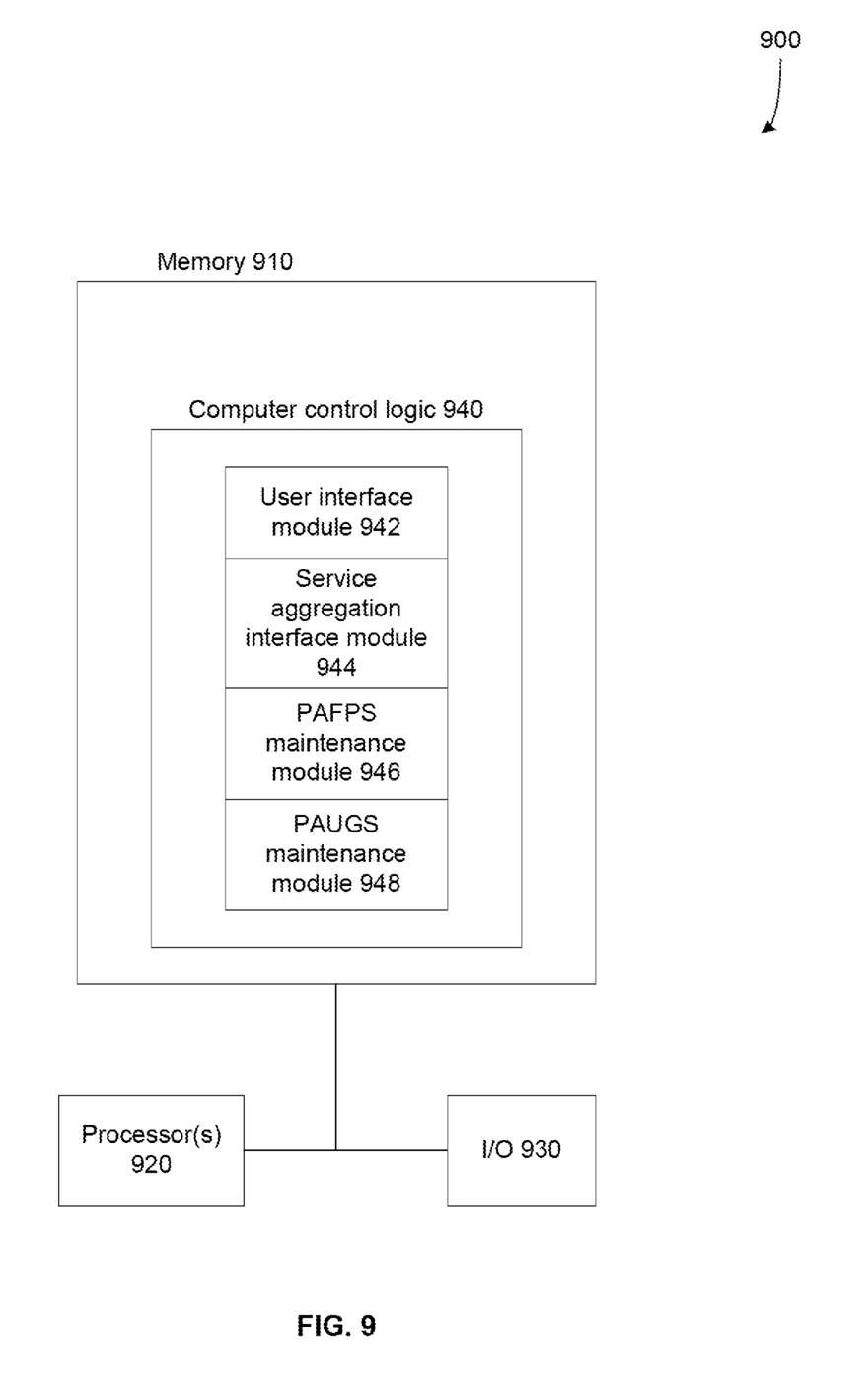
FIG. 9 is a block diagram illustrating a software or firmware embodiment.

A computing system that executes such software/firmware is shown in FIG. 9, according to an embodiment. The illustrated system 900 may include one or more processor(s) 920 and may further include a body of memory 910. Processor(s) 920 may include one or more central processing unit cores and/or a graphics processing unit having one or more GPU cores. Memory 910 may include one or more computer readable media that may store computer control logic 940. Memory 910 may be implemented as a hard disk and drive, a removable media such as a compact disk, a read-only memory (ROM) or random access memory (RAM) device, for example, or some combination thereof. Processor(s) 920 and memory 910 may be in communication using any of several technologies known to one of ordinary skill in the art, such as a bus or point-to-point interconnect. Computer control logic 940 contained in memory 910 may be read and executed by processor(s) 920. One or more I/O ports and/or I/O devices, shown collectively as I/O 930, may also be connected to processor(s) 920 and memory 910.

Computer control logic 940 may include logic that embodies some or all of the processing described above. In the illustrated embodiment, computer control logic 940 may include a user interface module 942 that implements user interfaces such as those shown at FIGS. 7 and 8. This module may be responsible for presenting the persisted stores in the forms shown in these figures, receiving user inputs, and presenting revised graphics to reflect any changed access permissions resulting from the user's inputs. These inputs may be interpreted and conveyed to a service aggregation interface module 944, which may be responsible for communication of instructions to one or more of the cloud content sharing services, wherein the commands correspond to the user's inputs. Computer control logic 940 may also include modules 946 and 948, which may be responsible for the construction and maintenance of the persisted aggregated file permissions store and persisted aggregated users/groups stores respectively. In an embodiment, the modules 942-948 may be incorporated in a unified cloud service management application such as that shown in FIG. 3, running on the user's computing device. In alternative embodiments, one or more of these modules may run as separate application programs.

Note that in other embodiments, modules 942-948 may be implemented in hardware, or in a combination of hardware, software, and/or firmware.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

The following examples pertain to further embodiments.

Example 1 is a system comprising a persisted aggregated users/groups store maintenance module configured to construct a persisted aggregated users/groups store that identifies files controlled by a user, wherein the files are maintained in a plurality of cloud content sharing services; a persisted aggregated file permissions store maintenance module configured to construct a persisted aggregated file permissions store that identifies access permissions associated with each file; a user interface module configured to display the persisted aggregated users/groups store and persisted aggregated file permissions store to the user, and to receive input from the user indicating how one or more of the access permissions are to be changed; an application program interface enabling interaction with the persisted stores, and a service aggregation interface module configured to issue an instruction to one or more of the cloud content sharing services to implement the change.

In example 2, the system of example 1 includes persisted aggregated file permissions store and persisted aggregated users/groups store that are displayed to the user in a graphical user interface (GUI) implemented by the user interface module and wherein the input from the user is received through the GUI.

In example 3, the access permissions of example 1 describe the user(s) or group(s) that are permitted to access a file.

In example 4, the access permissions of example 3 further describe whether the user(s) or group(s) are permitted to read or write to the file.

In example 5, the persisted aggregated users/groups store of example 1 further identifies directories controlled by the user, where the directories are maintained in the plurality of cloud content sharing services; and the persisted aggregated file permissions store of example 1 identifies access permissions associated with each directory.

In example 6, the permission change of example 5 comprises one of: extending, to a second user, access rights to a filing directory; and revoking, from the second user, access rights to the file or directory.

In example 7, the instruction of example 1 is implemented only if the user is authorized to change the one or more access permissions.

In example 8, the instruction of example 1 is directed to a particular cloud content sharing service that is selected on the basis of quality of service.

Example 9 is a method, comprising: constructing a persisted aggregated users/groups store that identifies files controlled by a user, wherein the files are maintained in a plurality of cloud content sharing services; constructing a persisted aggregated file permissions store that identifies access permissions associated with each file; displaying the persisted aggregated users/groups store and persisted aggregated file permissions store to the user receiving input from the user indicating how one or more of the access permissions are to be changed; and issuing an instruction to one or more of the cloud content sharing services to implement the change.

In example 10, the persisted aggregated file permissions store and persisted aggregated users/groups store of example 9 are displayed to the user in a graphical user interface (GUI) and the input from the user is received through the GUI.

In example 11, the access permissions of example 9 describe the user(s) or group(s) that are permitted to access a file.

In example 12, the access permissions of example 11 further describe whether the user(s) or group(s) are permitted to read or write to the file.

In example 13, the persisted aggregated users/groups store of example 9 further identifies directories controlled by the user, where the directories are maintained in the plurality of cloud content sharing services; and the persisted aggregated file permissions store of example 9 identifies access permissions associated with each directory.

In example 14, the permission change of example 13 comprises one of:
  extending, to a second user, access rights to a filing directory; and revoking, from the second user, access rights to the file or directory.

In example 15, the instruction of example 9 is implemented only if the user is authorized to change the one or more access permissions.

In example 16, the instruction of example 9 is directed to a particular cloud content sharing service that is selected on the basis of quality of service.

Example 17 is one or more computer readable media comprising having computer control logic stored thereon, the computer control logic comprising logic configured to cause a processor to: construct a persisted aggregated users/groups store that identifies files controlled by a user, wherein the files are maintained in a plurality of cloud content sharing services; construct a persisted aggregated file permissions store that identifies access permissions associated with each file; display the persisted aggregated users/groups store and persisted aggregated file permissions store to the user; receive input from the user indicating how one or more of the access permissions are to be changed; and issue an instruction to one or more of the cloud content sharing services to implement the change.

In example 18, the persisted aggregated file permissions store and persisted aggregated users/groups store of example 17 are displayed to the user in a graphical user interface (GUI) and the input from the user is received through the GUI.

In example 19, the access permissions of example 17 describe the user(s) or group(s) that are permitted to access a file.

In example 20, the access permissions of example 19 further describe whether the user(s) or group(s) are permitted to read or write to the file.

In example 21, the persisted aggregated users/groups store of example 17 further identifies directories controlled by the user, where the directories are maintained in the plurality of cloud content sharing services; and the persisted aggregated file permissions store of example 17 identifies access permissions associated with each directory.

In example 22, the permission change of example 21 comprises one of: ex-tending, to a second user, access rights to a file or directory; and revoking, from the second user, access rights to the file or directory.

In example 23, the instruction of example 17 is implemented only if the user is authorized to change the one or more access permissions.

In example 24, the instruction of example 17 is directed to a particular cloud content sharing service that is selected on the basis of quality of service.

Example 25 is a system for unifying interfaces of content sharing services, the system comprising: a persisted aggregated users/groups store maintenance module configured to construct a persisted aggregated users/groups store that identifies files controlled by a user, wherein the files are maintained in a plurality of cloud content sharing services; a persisted aggregated file permissions store maintenance module configured to construct a persisted aggregated file permissions store that identifies access permissions associated with each file; a user interface module configured to display the persisted aggregated users/groups store and persisted aggregated file permissions store to the user, and to receive input from the user indicating how one or more of the access permissions are to be changed an application program interface enabling interaction with the persisted stores, and a service aggregation interface module configured to issue an instruction to one or more of the cloud content sharing services to implement the change.

In example 26, the persisted aggregated file permissions store and persisted aggregated users/groups store of example 25 are displayed to the user in a graphical user interface (GUI) implemented by the user interface module and wherein the input from the user is received through the GUI.

In example 27, the access permissions of example 25 describe the user(s) or group(s) that are permitted to access a file.

In example 28, the access permissions of example 27 further describe whether the user(s) or group(s) are permitted to read or write to the file.

In example 29, the persisted aggregated users/groups store of example 25 further identifies directories controlled by the user, where the directories are maintained in the plurality of cloud content sharing services; and the persisted aggregated file permissions store of example 25 identifies access permissions associated with each directory.

In example 30, the permission change of example 29 comprises one of:
  extending, to a second user, access rights to a filing directory; and revoking, from the second user, access rights to the file or directory.

In example 31, the instruction of example 25 is implemented only if the user is authorized to change the one or more access permissions.

In example 32, the instruction of example 25 is directed to a particular cloud content sharing service that is selected on the basis of quality of service.

Example 33 is a method for unifying interfaces of content sharing services, the method comprising: constructing a persisted aggregated users/groups store that identities files controlled by a user, wherein the files are maintained in a plurality of cloud content sharing services, constructing a persisted aggregated file permissions store that identifies access permissions associated with each file; displaying the persisted aggregated users/groups store and persisted aggregated file permissions store to the user;
   receiving input from the user indicating how one or more of the access permissions are to be changed; and issuing an instruction to one or more of the cloud content sharing services to implement the change.

In example 34, the persisted aggregated file permissions store and persisted aggregated users/groups store of example 33 are displayed to the user in a graphical user interface (GUI) and the input from the user is received through the GUI.

In example 35, the access permissions of example 33 describe the user(s) or group(s) that are permitted to access a file.

In example 36, the access permissions of example 35 further describe whether the user(s) or group(s) are permitted to read or write to the file.

In example 37, the persisted aggregated users/groups store of example 33 further identifies directories controlled by the user, where the directories are maintained in the plurality of cloud content sharing services; and the persisted aggregated file permissions store of example 33 identifies access permissions associated with each directory.

In example 38, the permission change of example 37 comprises one of:
   extending, to a second user, access rights to a filing directory; and revoking, from the second user, access rights to the file or directory.

In example 39, the instruction of example 33 is implemented only if the user is authorized to change the one or more access permissions.

In example 40, the instruction of example 33 is directed to a particular cloud content sharing service that is selected on the basis of quality of service.

Example 41 is means for unifying interfaces of content sharing services, by causing a processor to perform any of the methods of examples 33-40.

Example 42 is one or more computer readable media comprising having computer control logic stored thereon, the computer control logic comprising logic configured to cause a processor to perform any of the methods of examples 33-40.

What is claimed is:

1. One or more non-transitory computer-readable media comprising instructions that cause a user device with one or more processor, in response to execution of the instructions by the user device, to:
   display an user interface (UI) to a user, wherein the UI displays at least a first graphic element to indicate a first object, a second graphic element to indicate a second object, a third graphic element to indicate a first party, a fourth graphic element to indicate a second party, a fifth graphic element to indicate a first cloud content sharing service provided by a first service provider, and a sixth graphic element to indicate a second cloud content sharing service provided by a second service provider different than the first service provider, wherein each of the first, second, third, fourth, fifth, and sixth graphic elements includes one or more of image data or text data, wherein the first object is stored in the first cloud content sharing service with a first access permission graphically represented by relative positions of the first graphic element with respect to the third graphic element and the fifth graphic element, the first access permission including a first read permission or a first write permission being graphically represented, and the second object is stored in the second cloud content sharing service with a second access permission including a second read permission or a second write permission graphically represented by relative positions of the second graphic element with respect to the fourth graphic element and the sixth graphic element that are visible at a same time as the relative positions of the first graphic element with respect to the third graphic element and the fifth graphic element, the second cloud content sharing service is different from the first cloud content sharing service, and the second party is different from the first party;
   receive an input from the user, wherein the input is associated with a change of a selected one of the first access permission to the first object or the second access permission to the second object; and
   in response to receipt of the input, cause the change to the selected one of the first access permission to the first object or the second access permission to the second object, and graphically represent the change to the first access permission or the second access permission in the UI by displaying of new relative positions of the first graphic element with respect to the third graphic element and the fifth graphic element, or by displaying of new relative positions of the second graphic element with respect to the fourth graphic element and the sixth graphic element.

2. The one or more non-transitory computer-readable media of claim 1, wherein the user device is further caused to:
   determine the user is authorized to make the change of the first access permission to the first object.

3. The one or more non-transitory computer-readable media of claim 1, wherein the user device is further caused to:
   access the first cloud content sharing service;
   convert the change of the first access permission to the first object to an instruction directed towards the first cloud content sharing service and the first object stored in the first cloud content sharing service; and
   update the UI to indicate the change of the first access permission to the first object.

4. The one or more non-transitory computer-readable media of claim 1, wherein the user device is further caused to:
   synchronize the first object with the first cloud content sharing service by a first interface application; and
   synchronize the second object with the second cloud content sharing service by a second interface application.

5. The one or more non-transitory computer-readable media of claim 1, wherein the UI is in a tabular form, or a graphical form.

6. The one or more non-transitory computer-readable media of claim 1, wherein the input from the user is to drag and drop a party name to a location of the UI associated with the first access permission.

7. The one or more non-transitory computer-readable media of claim 1, wherein the first access permission or the second access permission is read access, write access, read and write access, or no access.

8. The one or more non-transitory computer-readable media of claim 1, wherein the change of the first access permission to the first object includes a change to the first access permission by the first party, a change to the second access permission by the second party, or an addition of a third access permission by a third party to the first object.

9. The one or more non-transitory computer-readable media of claim 1, wherein the UI includes a first icon in a first shape to indicate the first object, a second icon in the first shape to indicate the second object, a third icon in a second shape to indicate the first party, a fourth icon in the second shape to indicate the second party, a first line between the first icon and the third icon to indicate the first access permission, and a second line between the second icon and the fourth icon to indicate the second access permission.

10. A cloud content sharing system, comprising:
a user device, wherein the user device includes a processor and memory configured to:
display an user interface (UI) to a user, wherein the UI displays at least a first graphic element to indicate a first object, a second graphic element to indicate a second object, a third graphic element to indicate a first party, a fourth graphic element to indicate a second party, a fifth graphic element to indicate a first cloud content sharing service provided by a first service provider, and a sixth graphic element to indicate a second cloud content sharing service provided by a second service provider different than the first service provider, wherein each of the first, second, third, fourth, fifth, and sixth graphic elements includes one or more of image data or text data, wherein the first object is stored in the first cloud content sharing service with a first access permission graphically represented by relative positions of the first graphic element with respect to the third graphic element and the fifth graphic element, the first access permission including a first read permission or a first write permission being graphically represented, and the second object is stored in the second cloud content sharing service with a second access permission including a second read permission or a second write permission graphically represented by relative positions of the second graphic element with respect to the fourth graphic element and the sixth graphic element that are visible at a same time as the relative positions of the first graphic element with respect to the third graphic element and the fifth graphic element, the second cloud content sharing service is different from the first cloud content sharing service, and the second party is different from the first party;
receive an input from the user, wherein the input is associated with a change of a selected one of the first access permission to the first object or the second access permission to the second object;
determine the user is authorized to make the change of the selected one of the first access permission to the first object or the second access permission to the second object; and
in response to receipt of the input and determination the user is authorized to make the change, cause the change to the selected one of the first access permission to the first object or the second access permission to the second object, and graphically represent the change to the first access permission or the second access permission in the UI by displaying of new relative positions of the first graphic element with respect to the third graphic element and the fifth graphic element, or by displaying of new relative positions of the second graphic element with respect to the fourth graphic element and the sixth graphic element.

11. The cloud content sharing system of claim 10, wherein the user device includes the processor and memory further configured to:
access the first cloud content sharing service;
convert the change of the first access permission to the first object to an instruction directed towards the first cloud content sharing service and the first object stored in the first cloud content sharing service; and
update the UI to indicate the change of the first access permission to the first object.

12. The cloud content sharing system of claim 10, wherein the user device includes the processor and memory further configured to:
synchronize the first object with the first cloud content sharing service by a first interface application; and
synchronize the second object with the second cloud content sharing service by a second interface application.

13. The cloud content sharing system of claim 10, wherein the first access permission or the second access permission is read access, write access, read and write access, or no access.

14. The cloud content sharing system of claim 10, wherein the change of the first access permission to the first object includes a change to the first access permission by the first party, a change to the second access permission by the second party, or an addition of a third access permission by a third party to the first object.

15. The cloud content sharing system of claim 10, wherein the UI includes a first icon in a first shape to indicate the first object, a second icon in the first shape to indicate the second object, a third icon in a second shape to indicate the first party, a fourth icon in the second shape to indicate the second party, a first line between the first icon and the third icon to indicate the first access permission, and a second line between the second icon and the fourth icon to indicate the second access permission.

16. A method of managing a cloud content sharing system, comprising:
displaying an user interface (UI) to a user, wherein the UI displays at least a first graphic element to indicate a first object, a second graphic element to indicate a second object, a third graphic element to indicate a first party, a fourth graphic element to indicate a second party, a fifth graphic element to indicate a first cloud content sharing service provided by a first service provider, and a sixth graphic element to indicate a second cloud content sharing service provided by a second service provider different than the first service provider, wherein each of the first, second, third, fourth, fifth, and sixth graphic elements includes one or more of image data or text data, wherein the first object is stored in the first cloud content sharing service with a first access permission graphically represented by relative positions of the first graphic element with respect to the third graphic element and the fifth graphic element, the first access permission including a first read permission or a first write permission being graphically represented, and the second object is stored in a second cloud content sharing service with a second access permission including a second read permission or a second write permission graphically represented by relative positions of the second graphic element with respect to the fourth graphic element and the sixth graphic element that are visible at a same time as the relative positions of the first graphic element with respect to the third graphic element and the fifth graphic element, the second cloud content sharing service is different from the first cloud content sharing service, and the second party is different from the first party;

receiving an input from the user, wherein the input is associated with a change of a selected one of the first access permission to the first object or the second access permission to the second object;

determining the user is authorized to make the change of the selected one of the first access permission to the first object or the second access permission to the second object; and in response to the receiving of the input and the determining the user is authorized to make the change, causing the change to the selected one of the first access permission to the first object or the second access permission to the second object, and graphically represent the change to the first access permission or the second access permission in the UI by displaying of new relative positions of the first graphic element with respect to the third graphic element and the fifth graphic element, or by displaying of new relative positions of the second graphic element with respect to the fourth graphic element and the sixth graphic element.

17. The method of managing the cloud content sharing system of claim 16, further comprising:

accessing the first cloud content sharing service;

converting the change of the first access permission to the first object to an instruction directed towards the first cloud content sharing service and the first object stored in the first cloud content sharing service; and updating the UI to indicate the change of the first access permission to the first object.

18. The method of managing the cloud content sharing system of claim 16, further comprising:

synchronizing the first object with the first cloud content sharing service by a first interface application; and synchronizing the second object with the second cloud content sharing service by a second interface application.

19. The method of managing the cloud content sharing system of claim 16, wherein the input from the user is to drag and drop a party name to a location of the UI associated with the first access permission.

20. The method of managing the cloud content sharing system of claim 16, wherein the first access permission or the second access permission is read access, write access, read and write access, or no access.

21. The method of managing the cloud content sharing system of claim 16, wherein the change of the first access permission to the first object includes a change to the first access permission by the first party, a change to the second access permission by the second party, or an addition of a third access permission by a third party to the first object.

22. The method of managing the cloud content sharing system of claim 16, wherein the UI includes a first icon in a first shape to indicate the first object, a second icon in the first shape to indicate the second object, a third icon in a second shape to indicate the first party, a fourth icon in the second shape to indicate the second party, a first line between the first icon and the third icon to indicate the first access permission, and a second line between the second icon and the fourth icon to indicate the second access permission.

23. The one or more non-transitory computer-readable media of claim 1, wherein the relative positions of the first graphic element with respect to the third graphic element and the fifth graphic element to graphically represent the first access permission includes an arrangement of the first, third, and fifth graphic elements in a directory tree structure.

24. The cloud content sharing system of claim 10, wherein the relative positions of the first graphic element with respect to the third graphic element and the fifth graphic element to graphically represent the first access permission includes an arrangement of the first, third, and fifth graphic elements in a directory tree structure.

25. The method of managing the cloud content sharing system of claim 16, wherein the relative positions of the first graphic element with respect to the third graphic element and the fifth graphic element to graphically represent the first access permission includes an arrangement of the first, third, and fifth graphic elements in a directory tree structure.

* * * * *

UNITED STATES PATENT AND TRADEMARK OFFICE
CERTIFICATE OF CORRECTION

PATENT NO. : 10,796,012 B2
APPLICATION NO. : 14/125504
DATED : October 6, 2020
INVENTOR(S) : Steven J. Birkel et al.

Page 1 of 1

It is certified that error appears in the above-identified patent and that said Letters Patent is hereby corrected as shown below:

In the Claims

Column 11
Line 59, "more processor,..." should read – "more processors,..."

Signed and Sealed this
Eighth Day of December, 2020

Andrei Iancu
*Director of the United States Patent and Trademark Office*